United States Patent
Abe

(10) Patent No.: US 6,916,039 B2
(45) Date of Patent: Jul. 12, 2005

(54) LEG PROTECTION DEVICE

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/384,694

(22) Filed: Mar. 11, 2003

(65) Prior Publication Data

US 2003/0193174 A1 Oct. 16, 2003

(30) Foreign Application Priority Data

Apr. 15, 2002 (JP) ........................................ 2002-112313

(51) Int. Cl.$^7$ ............................................. B60R 21/24
(52) U.S. Cl. .................... 280/729; 280/730.1; 280/752; 280/753; 280/743.2
(58) Field of Search ............................. 280/729, 730.1, 280/752, 753, 743.1, 743.2

(56) References Cited

U.S. PATENT DOCUMENTS

| | | | | |
|---|---|---|---|---|
| 4,290,627 A | * | 9/1981 | Cumming et al. | ........... 280/729 |
| 4,300,894 A | * | 11/1981 | Cumming et al. | ........... 493/210 |
| 5,240,283 A | * | 8/1993 | Kishi et al. | .................. 280/729 |
| 6,155,595 A | | 12/2000 | Schultz | |
| 6,685,217 B2 | * | 2/2004 | Abe | .......................... 280/730.1 |

FOREIGN PATENT DOCUMENTS

DE    199 46 477    3/2001

* cited by examiner

Primary Examiner—Eric Culbreth
(74) Attorney, Agent, or Firm—Manabu Kanesaka

(57) ABSTRACT

A main chamber is formed of a front panel and a rear panel connected together, and the interior thereof is partitioned into small chambers by partition panels. A surface panel is sewn to the front side of the front panel to form an auxiliary chamber in between. When a gas generator is actuated to generate a gas, the gas flows to the auxiliary chamber through the small chambers, and the auxiliary chamber is inflated while the surface panel bulges out toward an occupant.

9 Claims, 4 Drawing Sheets

LEG PROTECTION DEVICE

BACKGROUND OF THE INVENTION AND RELATED ART STATEMENT

The present invention relates to a leg protection device having a knee bag for preventing a lower leg of an occupant from hitting an interior panel in front of a seat in case of collision of a car or the like, and also for preventing a lower body of the occupant from moving toward the front of the vehicle by restraining the knee.

A leg protection device protects a lower leg of an occupant from a heavy load due to an impact hitting against an interior panel in front of a seat when a high-speed moving object, such as a car, experiences a head-on collision. A conventional device includes an air bag disposed inside the interior panel, i.e. in a space behind a back side of the interior panel, a gas generator for inflating the air bag, and a lid for covering the air bag in a normal state (when the high-speed moving object, such as a car, is not involved in a collision).

In such a leg protection device, the air bag is folded and placed inside the interior panel in the normal state, and the lid is mounted so as to cover the folded air bag.

When the car or the like experiences a head-on collision, the gas generator is actuated to eject a gas, and the ejected gas is supplied to the air bag, thereby rapidly inflating the air bag. In this case, the lid is opened with the inflation of the air bag, and the air bag is projected from the interior panel. Then, the airbag is inflated and deployed between the interior panel and the lower leg of the occupant so as to protect the lower leg from hitting the interior panel (hereinafter, such a type of airbag inflated in front of the leg will be referred as a "knee bag").

An object of the present invention is to provide a leg protection device having a knee bag to be widely inflated and deployed in front of the leg in a short time even with a gas generator having a low output.

Another object of the present invention is to provide a leg protection device that ensures a sufficiently large thickness after the inflation.

Further objects and advantages of the invention will be apparent from the following description of the invention.

SUMMARY OF THE INVENTION

A leg protection device of the present invention includes a knee bag to be inflated in front of a leg of an occupant in a vehicle, and a gas generator for inflating the knee bag. The knee bag includes a main chamber to be first inflated by a gas introduced from the gas generator, and an auxiliary chamber placed along a surface of the main chamber close to the occupant or a surface of the main chamber away from the occupant to be inflated by a gas introduced from the main chamber.

In such a leg protection device, when the gas generator is actuated, the main chamber is inflated and deployed in front of the leg by the gas from the gas generator. In a case that the main chamber has a relatively small thickness (thickness in the front-rear direction relative to the occupant), the main chamber can be quickly inflated and deployed even with a gas generator having a low output due to a small capacity of the main chamber.

In general, a distance between the leg of the occupant and the interior panel in front of the leg is short. Therefore, such a device in which the main chamber is quickly inflated and deployed in front of the leg is considerably effective in preventing the leg from directly hitting the interior panel.

In the present invention, after the main chamber is inflated and deployed in front of the leg, the gas is introduced into the auxiliary chamber from the main chamber, thereby inflating the auxiliary chamber. Consequently, the knee bag has a sufficiently large thickness when inflated.

In the present invention, it is preferable that the main chamber is formed of a front panel close to the occupant and a rear panel away from the occupant. The auxiliary chamber is formed of an auxiliary-chamber panel and one of the front panel and the rear panel facing the auxiliary-chamber panel. In this knee bag, a small number of the panels constitutes the auxiliary chamber, thereby reducing a size of the folded knee bag and a cost thereof.

The auxiliary-chamber panel may have a tucked portion at the periphery thereof. With the tucked portion, it is possible to increase the thickness of the auxiliary chamber when inflated.

DETAILED DESCRIPTION OF PREFERRED EMBODIMENTS

Figure 1:
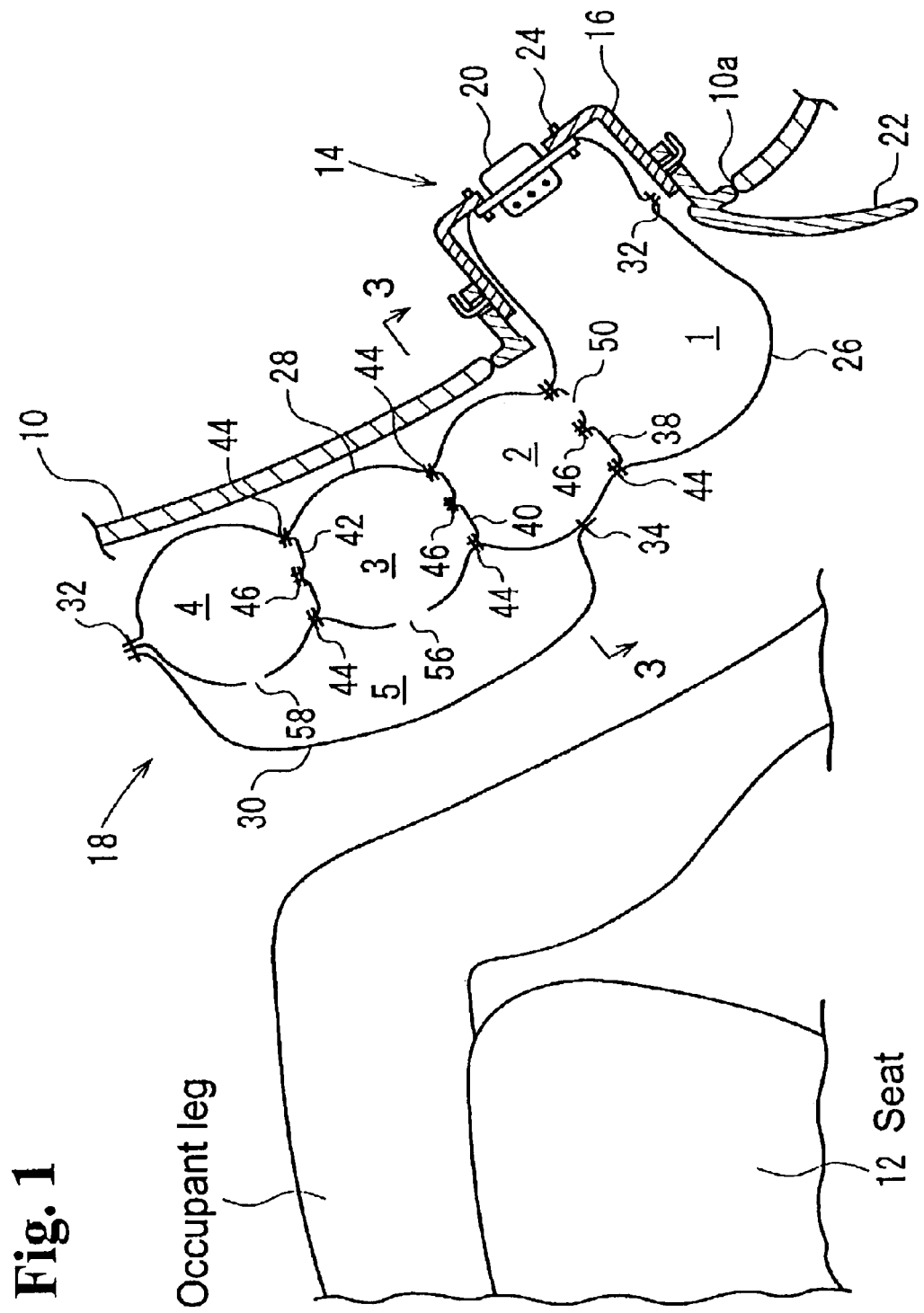
FIG. 1 is a longitudinal sectional view of a knee bag according to an embodiment of the present invention.
Figure 2:
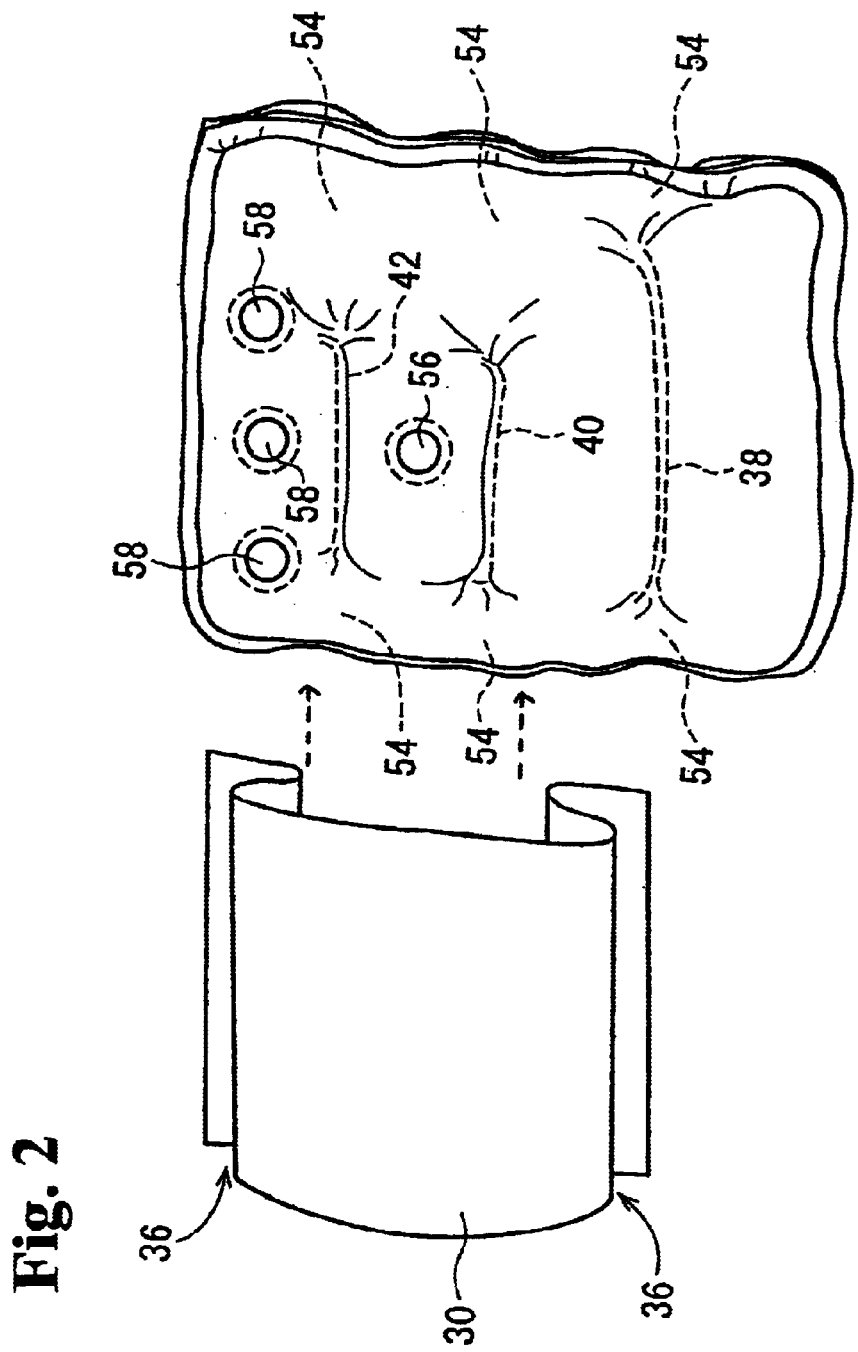
FIG. 2 is an exploded perspective view of the knee bag shown in FIG. 1.
Figure 3:
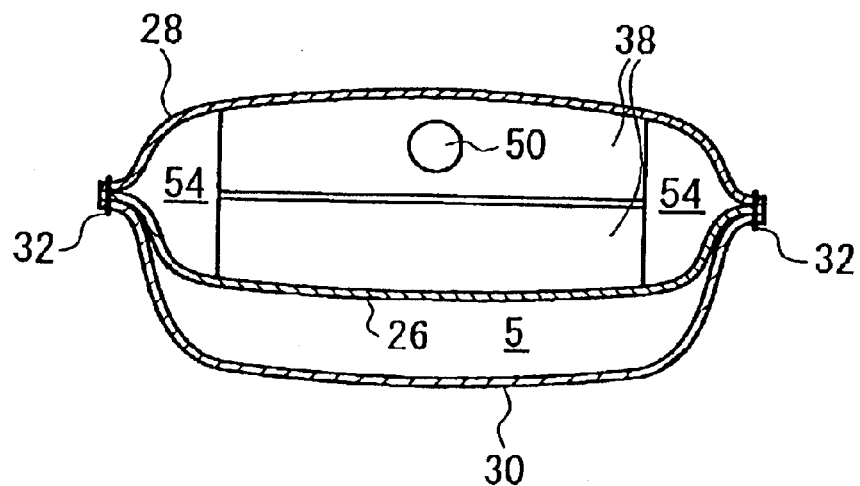
FIG. 3 is a sectional view of the knee bag taken along line 3—3 in FIG. 1.

Hereunder, embodiments of the present invention will be described with reference to the accompanying drawings. FIG. 1 is a longitudinal sectional view showing a section of a vehicle in front of a seat in a state that a knee bag according to an embodiment of the present invention is inflated. FIG. 2 is an exploded perspective view of the knee bag, and FIG. 3 is a cross sectional view of the knee bag taken along line 3—3 in FIG. 1. In the following description, the horizontal direction refers to a width direction of the vehicle.

A leg protection device 14 is installed in an interior panel 10 in front of a seat 12. The leg protection device 14 includes a retainer 16 having a container shape, a knee bag 18 disposed in the retainer 16, and a gas generator 20 for inflating the knee bag 18. The retainer 16 is placed at an opening 10a provided in the interior panel 10. Normally, the knee bag 18 is stored inside the retainer 16 in a folded state, and a lid 22 is mounted at the front of the retainer 16 to cover the knee bag 18. The lid 22 is normally arranged to be substantially flush with the interior panel 10, and to open toward the front side of the interior panel 10 with its lower end as a pivot when the knee bag 18 is inflated.

The knee bag 18 is clamped between a flange of the gas generator 20 and the retainer 16 at the rim of a gas inlet, and is fixed to the retainer 16 by bolts 24 fastening the gas generator 20 to the retainer 16.

The knee bag 18 includes a front panel 26 facing the occupant, a rear panel 28 facing the interior panel 10, and a surface panel 30 overlapping the front panel 26 in front thereof. The front panel 26 and the rear panel 28 are sewn together with sewing thread 32 at their peripheries to form a bag, and a main chamber is formed inside the bag.

A gas inlet is formed at the bottom of the rear panel 28, and a rim of the gas inlet is connected to the retainer 16 together with the gas generator 20, as described above.

The surface panel 30 are sewn to the front panel 26 with the sewing thread 32 at upper, right, and left edges thereof. A lower edge of the surface panel 30 is sewn to the front panel 26 with sewing threads 34.

Figure 4:
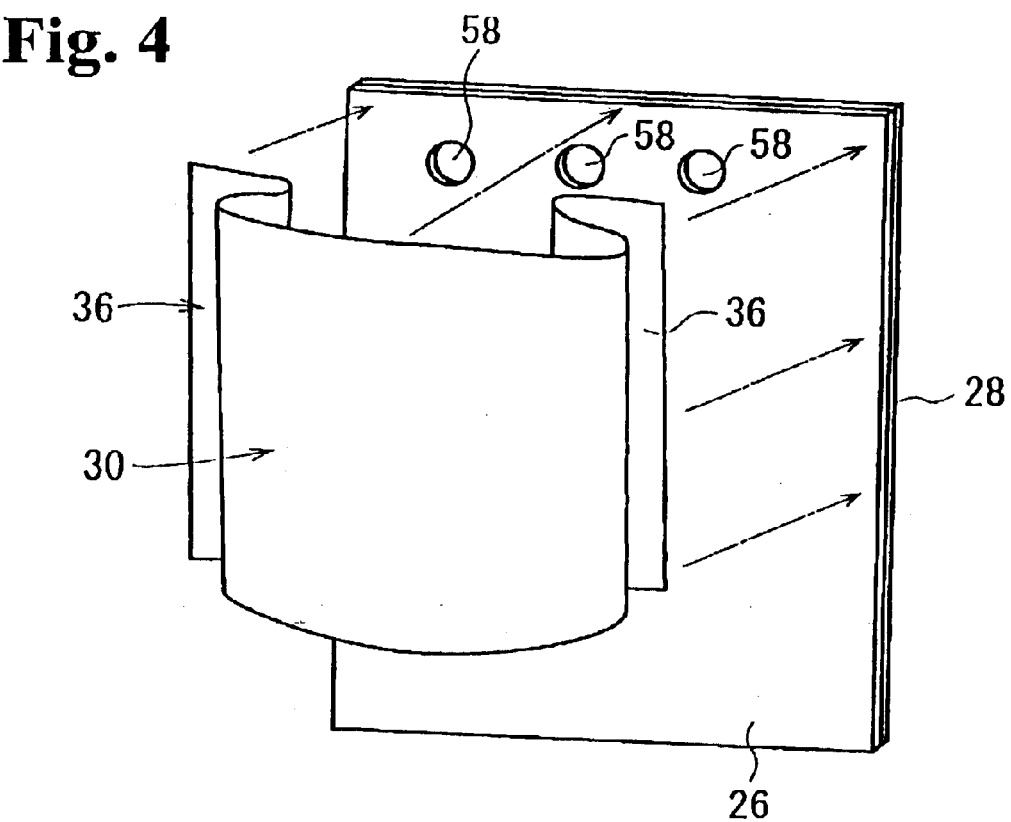
FIG. 4 is an exploded perspective view of a knee bag according to another embodiment of the present invention.

Tucked portions 36 are provided at the upper and lower edges of the surface panel 30. The tucked portions 36 may be provided at the right and left edges of the surface panel 30, as shown in FIG. 4, or may be provided at all of the upper, lower, right, and left edges thereof (not shown). An auxiliary chamber 5 is formed between the surface panel 30 and the front panel 26.

The interior of the main, chamber surrounded by the front panel 26 and the rear panel 28 is partitioned into four small chambers, namely, the first chamber 1, the second chamber 2, the third chamber 3, and the fourth chamber 4 provided in that order from the bottom, by partition panels 38, 40, and 42 extending between the front panel 26 and the rear panel 28. The partition panels 38, 40, and 42 extend in the horizontal direction, and are connected to the front panel 26 and the rear panel 28 with the sewing threads 44.

In this embodiment, two partition panels 38, two partition panels 40, and two partition panels 42 are sewn together with sewing threads 46, respectively.

Spaces 54 are formed between ends of the partition panels 38, 40, and 42 in the longitudinal (horizontal) direction and side edges of the knee bag 18 for allowing the gas to flow through. The lowermost first chamber 1 and the second chamber 2 that is the second from the bottom also communicate with each other through an opening 50 formed in the partition panel 38.

A portion of the front panel 26 facing the third chamber 3 and the fourth chamber 4 is provided with openings 56 and 58 for allowing the gas to flow from the third chamber 3 and the fourth chamber 4 into the auxiliary chamber 5. The third chamber 3 has one opening 56 and the fourth chamber 4 has three openings 58, so that the gas flows from the fourth chamber 4 into the auxiliary chamber 5 in a larger quantity than from the third chamber 3. Instead of adjusting the number of the openings, the opening 58 of the fourth chamber 4 may have a diameter larger than that of the opening 56.

In the leg protection device 14 having the knee bag 18 with such a configuration, the gas generator 20 is actuated in case of a car collision to generate the gas for inflating the knee bag. The knee bag 18 starts expanding by the gas, pushes the lid 22 open, projects out toward the front side of the interior panel 10, and is deployed upward along the interior panel 10.

During this time, in the knee bag 18, the first chamber 1 is first inflated, and the second chamber 2, the third chamber 3, and the fourth chamber 4 are inflated sequentially. When the third chamber 3 and the fourth chamber 4 are inflated to a certain extent, the gas flows from the third chamber 3 and the fourth chamber 4 into the auxiliary chamber 5 through the openings 56 and 58, so that the auxiliary chamber 5 is inflated while the surface panel 30 bulges out toward the occupant.

Since the small chambers 1 to 4 other than the auxiliary chamber 5 are first inflated in this way, even if the gas generator 20 has a low-output and generates only a small amount of the gas, the knee bag 18 is quickly deployed into the area in front of the leg along the interior panel 10. In this first deployment stage, the auxiliary chamber 5 is not inflated or is inflated only partially, and the thickness of the knee bag 18 is small. Therefore, the knee bag 18 is quickly inflated in a narrow space between the interior panel 10 and the leg.

Subsequently, the auxiliary chamber 5 is inflated by the gas from the third chamber 3 and the fourth chamber 4, and the knee bag 18 increases in thickness to receive the leg. Consequently, an impact applied to the leg is absorbed sufficiently.

In particular, since the surface panel 30 has the tucked portions 36 in this embodiment, the thickness of the knee bag 18 becomes sufficiently large when the auxiliary chamber 5 is inflated, and a large amount of the impact applied to the leg can be absorbed.

While the first chamber 1 to the fourth chamber 4 are partitioned by the partition panels 38, 40, and 42 in the above embodiment, they may be partitioned by directly sewing the front panel and the rear panel without using the partition panels.

Figure 5:
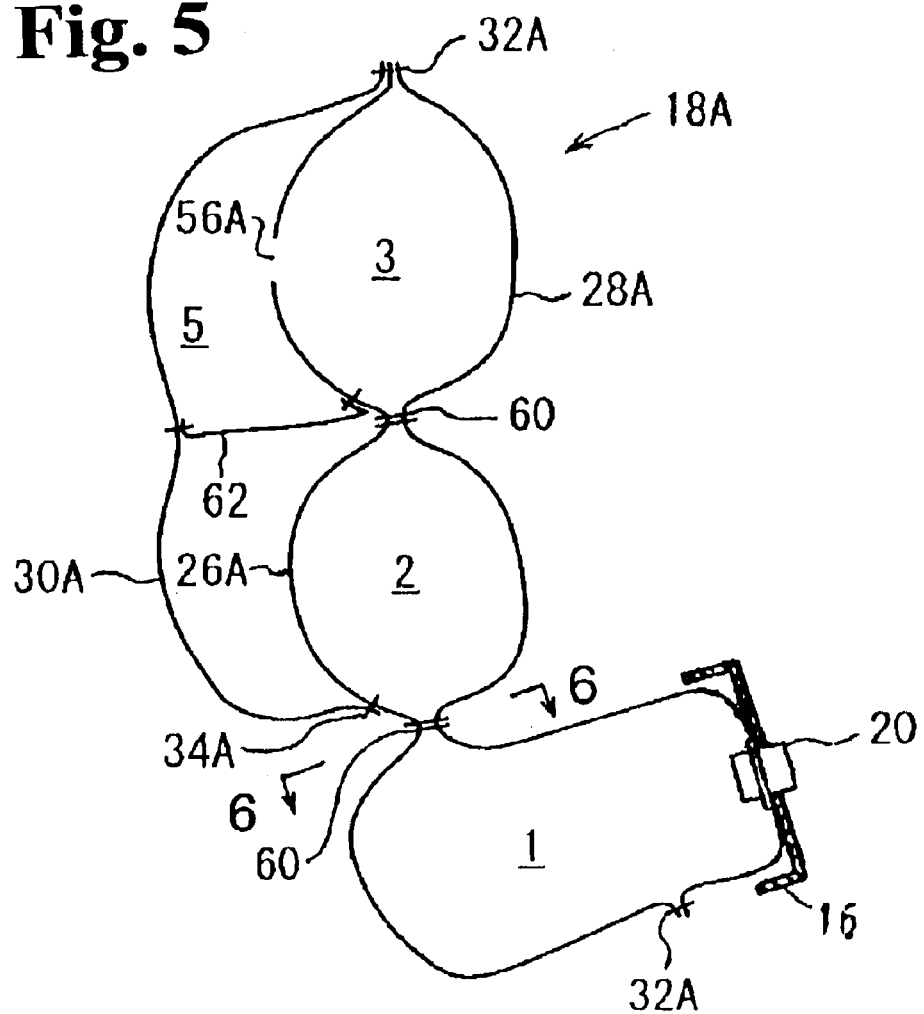
FIG. 5 is a longitudinal sectional view of a knee bag according to another embodiment of the present invention.
Figure 6:
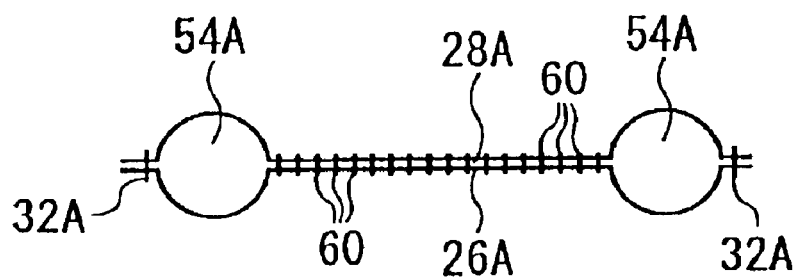
FIG. 6 is a sectional view taken along line 6—6 in FIG. 5.

FIGS. 5 and 6 show a configuration of a knee bag according to another embodiment. FIG. 5 is a longitudinal sectional view similar to FIG. 1, and FIG. 6 is a cross-sectional view taken along line 6—6 in FIG. 5.

In this knee bag 18A, a front panel 26A and a rear panel 28A are sewn together at the peripheries thereof with sewing threads 32A, thereby forming the main chamber. In order to divide the main chamber into the first chamber 1, the second chamber 2, and the third chamber 3, the front panel 26A and the rear panel 28A are also sewn at sewing portions 60 formed in the horizontal direction. Both ends of the sewing portions 60 are located away from the right and left edges of the knee bag 18A, so that gas passages 54A are formed at both the right and left ends of the sewing portions 60.

A surface panel 30A is placed so as to overlap the front panel 26A, and is sewn to the front panel 26A with sewing threads 32A and 34A, thereby forming an auxiliary chamber 5. Although not shown, the surface panel 30A also has tucked portions. The auxiliary chamber 5 communicates with the third chamber 3 through an opening 56A formed in the front panel 26A.

In this embodiment, the surface panel 30A and the front panel 26A are connected by a tether belt 62 in order to prevent the surface panel 30A from being excessively inflated to protrude toward the occupant when the auxiliary chamber 5 is inflated. Such a tether belt may be adopted in the embodiment shown in FIGS. 1 to 4.

In the knee bag 18A, the first chamber 1, the second chamber 2, and the third chamber 3 are also inflated in that order by the gas from a gas generator 20, and are quickly deployed toward the front side of the leg along an interior panel. Then, the auxiliary chamber 5 is inflated to receive the leg.

In this way, the knee bag 18A is quickly inflated toward the front of the leg even when the gas generator 20 has a low output. Moreover, after the auxiliary chamber 5 is inflated, the thickness of the knee bag 18A is sufficiently large, and the impact applied to the leg is absorbed sufficiently.

The above embodiments are examples of the present invention, and the present invention may be carried out by other embodiments.

For example, while the main chamber is partitioned into three or four small chambers in the above embodiments, it may be partitioned into two chambers or five or more chambers.

While the partition panels or sewing portions extending in the horizontal direction are adopted in order to partition the main chamber in the above embodiments, some or all of the partition panels or sewing portions may extend vertically.

While the surface panels 30 and 30A have the tucked portions in the above embodiments, the tucked portions may be omitted.

While the front panel and the rear panel are separate in the above embodiments, a continuous panel may be folded in two to form the front panel and the rear panel.

While the auxiliary chamber is formed on the occupant side of the main chamber in the above embodiments, it may be formed on the side of the main chamber facing the interior panel. That is, the auxiliary chamber may be formed of the rear panel 28 and the surface panel.

As described in detail above, the present invention provides the leg protection device having the knee bag that is extremely quickly deployed in front of the leg even with the gas generator having a low output and that ensures a large thickness after the inflation.

While the invention has been explained with reference to the specific embodiments of the invention, the explanation is illustrative and the invention is limited only by the appended claims.

What is claimed is:

1. A leg protection device for protecting a leg of an occupant in a vehicle, comprising:
    a gas generator for generating a gas, and
    a knee bag to be inflated in front of the leg, and having a main chamber formed of a plurality of subchambers arranged in series and including one subchamber directly connected to the gas generator to be inflated by the gas from the gas generator and another subchamber connected to said one subchamber and inflated by the gas passing through said one subchamber, and an auxiliary chamber communicating with said another subchamber to be inflated by the gas from said another subchamber, said auxiliary chamber covering said another subchamber at one side thereof without covering said one subchamber directly connected to the gas generator and extending along the occupant when the knee bag is inflated.

2. A leg protection device according to claim 1, wherein said main chamber is formed of a front panel facing the occupant and a rear panel located at a side opposite to the occupant when the knee bag is inflated, and said auxiliary chamber is formed of an auxiliary-chamber panel and said front panel.

3. A leg protection device according to claim 2, wherein said auxiliary-chamber panel has a tucked portion on a periphery thereof.

4. A leg protection device according to claim 2, further comprising a tether situated inside the knee bag for connecting the auxiliary-chamber panel and the front panel.

5. A leg protection device according to claim 2, wherein said main chamber includes at least three subchambers arranged in series to have fluid communication with each other, said one subchamber being located at one end and connected to the gas generator, said auxiliary chamber extending over rest of the subchambers except for said one subchamber and communicating with a subchamber located furthest from said one subchamber.

6. A leg protection device according to claim 5, further comprising a partition panel situated between the front and rear panels for dividing the main chamber.

7. A leg protection device according to claim 5, wherein one of the subchambers is not directly connected to the gas generator and communicates with the auxiliary chamber.

8. A leg protection device for protecting a leg of an occupant in a vehicle, comprising:
    a gas generator for generating a gas,
    a knee bag to be inflated in front of the leg, and having a main chamber connected to the gas generator to be inflated by the gas from the gas generator and formed of a panel member including a front panel facing the occupant and a rear panel located at a side opposite to the occupant when the knee bag is inflated, and an auxiliary chamber communicating with the main chamber to be inflated by the gas from the main chamber, said auxiliary chamber covering the main chamber at one side of the main chamber extending along the occupant when the knee bag is inflated and being formed of an auxiliary-chamber panel and a part of the panel member forming the main chamber, and
    a tether situated inside the knee bag for connecting the auxiliary-chamber panel and the panel member forming the main chamber.

9. A leg protection device according to claim 8, wherein said auxiliary chamber is formed at a side facing the occupant and the tether is connected between the auxiliary-chamber panel and the front panel.

* * * * *